UNITED STATES PATENT OFFICE 2,376,119

PROCESS FOR THE ALKYLATION OF AROMATIC COMPOUNDS

Frank Henry Bruner, Beacon, Louis Alfred Clarke, Fishkill, and Richard Leigh Sawyer, New York, N. Y., assignors to The Texas Company, New York, N. Y., a corporation of Delaware No Drawing. Application July 18, 1942, Serial No. 451,494

2 Claims. (Cl. 260—671)

Our invention relates to the alkylation of aromatic compounds, and particularly to the alkylation of aromatic hydrocarbons with normally gaseous olefins to produce predominately mono-alkylated products.

Various processes have been suggested in the past for the alkylation of aromatic hydrocarbons with gaseous olefins, but these have had numerous disadvantages from a commercial standpoint. In an attempt to minimize olefin polymerization, such reactions have been effected by absorbing the gaseous olefin in the aromatic hydrocarbon in the presence of an alkylation catalyst, but the rate of olefin absorption in such processes is undesirably low for commercial operation. Furthermore, the catalysts which have been employed, e. g., sulfuric acid, hydrofluoric acid, aluminum chloride, and nickel-boron fluoride complexes, have had various undesirable characteristics, such as a tendency to promote oxidation or polymerization reactions, or to produce poly-alkylated compounds at the expense of the desired mono-alkylated products.

We have now discovered that very satisfactory alkylation may be effected by the reaction of liquid olefins with aromatic compounds if a catalyst is employed which comprises essentially boron trifluoride and water. By using this catalyst and the procedure hereinafter described, it is possible to alkylate aromatic hydrocarbons by means of liquefied normally gaseous olefins with the production of high yields of mono-alkylated products, and with relatively little olefin polymerization.

Although our catalysts are referred to herein as "comprising essentially boron trifluoride and water," it should be understood that this expression signifies materials whose chemical composition may be expressed in terms of $BF_3$ and $H_2O$, although the actual chemical compounds present may be largely reaction products of these two compounds. The following equations indicate the types of such reaction products which are possibly present in our catalysts:

$$4BF_3 + 3H_2O \rightarrow 3HBF_4 + H_3BO_3$$
$$2BF_3 + 2H_2O \rightarrow HBF_4 + HBF_2(OH)_2$$
$$BF_3 + H_2O \rightarrow HBF_3(OH)$$

It should be understood, however, that our invention is in no way limited by theoretical considerations as to the possible compounds present in the catalysts. Thus, our preferred catalysts correspond essentially in ultimate analysis to $BF_3.nH_2O$, where "$n$" has a value ranging from about 1 to about 1½; and any catalyst having an ultimate analysis within this range may be employed, irrespective of the molecular constitution giving rise to this analysis.

Suitable catalysts may be prepared by passing gaseous boron trifluoride into water until the desired concentration is obtained. The preferred catalyst is prepared in this manner, by introducing boron trifluoride into water at ordinary room temperatures until a saturated solution is obtained. In this preparation, a flocculent precipitate is formed initially, but this gradually disappears, with the ultimate formation of a clear or slightly cloudy, syrupy liquid, having a specific gravity of about 1.77 at 72–75° F. This saturated solution corresponds approximately to the formula $BF_3.H_2O$ and has the approximate composition of 79% $BF_3$ by weight, and 21% $H_2O$ by weight.

The water content of the catalyst may be varied to some extent, but there should, in all cases, be sufficient water to form a liquid catalyst, and insufficient to inactivate the catalyst by undue dilution. From the standpoint of minimizing olefin polymerization, there appear to be critical limits in the water content of the catalyst. This critical range of composition is from about $BF_3.1H_2O$ to $BF_3.1½H_2O$, or from about 21% to about 29% $H_2O$ by weight.

Although the absorption of boron trifluoride in water constitutes a very satisfactory method of catalyst preparation, it will be apparent that other equivalent methods are available for the production of catalysts having the constitution defined above. For example, the reaction of 6 mols of hydrofluoric acid and 1 mol of boric anhydride will produce a catalyst of the constitution $BF_3.1½H_2O$. The absorption of additional boron trifluoride in this catalyst will produce products having lower ratios of $H_2O/BF_3$, within the range referred to above. Other methods of preparation involving the use of hydrofluoboric acid, or poly-hydroxyfluoboric acids will be apparent to those skilled in the art.

Since boron trifluoride is extremely volatile, and since it is also somewhat soluble in the non-aqueous phase of certain reaction mixtures, the catalysts may become depleted of this component after continued use. Catalysts which are deactivated in this manner may be reactivated by the incorporation of additional $BF_3$. Thus, after one or more batch alkylations, the catalyst is suitably brought up to its original strength, by absorption of addition $BF_3$, prior to utilization in a succeeding batch alkylation. In continuous alkylation it is desirable to effect continuous reactivation of the catalyst. In continuous alkylation processes, the aqueous catalyst phase is separated from the reaction mixture and is recycled to the reaction vessel. With our present catalysts it is also desirable to recover any gaseous $BF_3$ which may separate from the reaction mixture, and to separate any dissolved $BF_3$ from the non-aqueous phase of the reaction mixture. The $BF_3$ thus separated may suitably be absorbed in the aqueous catalyst phase, together with any additional $BF_3$ required for reactivation, before recycling the catalyst to the reaction vessel. Alternatively, any $BF_3$ dissolved in the non-aqueous phase of the reaction mixture may be recovered by distillation, together with the excess unreacted aromatic reactant, and may be recycled to the reaction vessel as a solution in said excess aromatic compound. Other equivalent methods for recycling the $BF_3$ and maintaining the catalyst in activated condition will be apparent to those skilled in the art.

Any of the aromatic hydrocarbons, such as benzene, toluene, naphthalene, anthracene, and the like, may be alkylated with liquid olefins when employing catalysts of the above type. The alkylation of the aromatics is effected by reaction between hydrocarbon groups of the reacting molecules, but it should be understood that the presence in the aromatic nucleus of other substituents such as hydroxyl groups, which do not interfere with the alkylation mechanism, is not excluded from the scope of our invention. Our process is applicable to the alkylation of all aromatic compounds which are known to undergo the Friedel-Crafts type of reaction. The preferred aromatic compounds for our alkylation process, however, are the monocyclic hydrocarbons, such as benzene and toluene.

Any of the olefins may be employed in our process, although we prefer to use the lower members of the series, and especially the normally gaseous olefins, such as ethylene, propylene, butylene-1, butylene-2, isobutylene, and isoamylene. For optimum alkylation, we prefer to employ a substantially pure olefin, but it is to be understood that olefin-containing gas mixtures, such as refinery gases, may be liquefied and employed in our process. We generally prefer, however, to employ a gas containing at least 80% olefin by volume.

Although our process is especially adapted for using an olefin, per se, as the alkylating agent, olefin derivatives may also be used for this purpose. Thus, olefin addition products, such as the corresponding alcohols, may be employed as alkylating agents in the process of the present invention. It is to be understood, therefore, that the use of such equivalents instead of the olefins, per se, is included in the scope of our invention.

Both of the reactants for our alkylation process should preferably be used in a substantially anhydrous condition. Otherwise, the water content of the reactants should be considered in determining the original catalyst composition and when refortifying used catalyst with additional $BF_3$. Water of reaction, resulting from the use of alcohols or the like as alkylating agents, should similarly be taken into account in controlling the catalyst composition.

The alkylation reaction of the present invention may be effected by batch operation, or by the use of concurrent flow, countercurrent flow, or a combination of concurrent and countercurrent flow; and the process may be carried out in either a single or a plurality of stages as desired. The reaction may be effected under known alkylating conditions, in accordance with prior practices in the art for the alkylation of aromatic hydrocarbons using other catalysts. However, for the production of maximum yields of mono-alkylated products, with minimum olefin polymerization, we prefer to use certain ranges of reaction conditions, as described below:

The reaction temperature may range from 60° F. or lower, to 150° F., but is preferably maintained between 75° F. and 125° F. Increased reaction rates are obtained at the higher temperatures without affecting undesirably the desired ratio of reaction products, and one advantage of our catalysts is the fact that they do not promote oxidation reactions at such temperatures.

The reaction pressure should be sufficiently high to maintain the reaction mixture in the liquid state. The actual pressure employed will, of course, vary for different olefins and for different ratios of olefin to aromatic in the reaction mixture. In any case, however, the pressure should be at least equal to the total vapor pressure of the reaction mixture at the reaction temperature. Pressures greatly in excess of this value do not appear to affect the reaction, and are undesirable from the standpoint of apparatus costs.

The ratio of aromatic to olefin in the reaction mixture is an important feature of our alkylation process for the production of high yields of mono-alkylated product with minimum olefin polymerization. The molar ratio of aromatic to olefin in the charge should be higher than 2:1 and preferably should be maintained at 5:1 or above. Improved results may be obtained by greatly exceeding these values, but the improvement in product quality usually does not warrant the expense involved in the use of extremely high ratios in the charge mixture. The upper limit of the ratio in the charge for batch operation will therefore be limited by economic considerations.

In continuous operation of the process, on the other hand, it is possible to increase the effective ratio in the reaction zone very considerably above the ratio in the charge, by the use of various expedients such as aromatic recycle, emulsion recycle, or the use of split olefin feed when employing a plurality of reactors in series. By using one or more of these operations, it is possible to secure a ratio of aromatic to olefin, at the point of initial contact of the olefin with the catalyst, as high as several hundred to one. Generally, however, it is unnecessary to exceed a ratio of 150:1, and ratios of 100:1 to 150:1 represent a desirable operating range for continuous alkylation.

For the production of high yields of monoalkylated product, with minimum olefin polymerization, it is also preferable to maintain a relatively high absolute concentration of aromatic in the reaction mixture throughout the process, as well as maintaining a high ratio of aromatic to olefin. From this standpoint, the presence of diluents in the olefin charge are undesirable, and the best results are obtainable when employing a charge mixture consisting of only aromatic and olefin. The reaction mixture, however, may contain considerable amounts of other materials, such as the reaction products, in addition to the aromatic-olefin charge mixture, and it is generally sufficient to maintain the concentration of aromatic reactant in the non-aqueous phase of the reaction mixture at 50% by volume, or above. It is often desirable to recycle poly-alkylated reaction products to the reaction zone to suppress further production of these products, and this recycling will result in lower absolute concentrations of aromatic reactant in the reaction mixture. In such cases, the total concentration of aromatic reactant and recycled reaction products in the mixture is preferably maintained at 50% by volume, or as much higher as can be economically effected.

The amount of catalyst to be employed may vary considerably, depending upon the reaction conditions. For batch operation, we prefer to use at least 1 volume of catalyst per 10 volumes of total reactants, or at least 1 volume of catalyst per volume of olefin to be employed in the reaction. For continuous operation, we prefer to maintain a ratio of catalyst to non-aqueous phase in the reaction zone of at least one volume of catalyst per volume of the non-aqueous phase. Amounts of catalyst up to two volumes per volume of total reactants, or 20 volumes per volume of olefin are very satisfactory, but ratios above or below these specific values may be employed if desired.

The catalyst and reactants in the reaction zone should be agitated sufficiently to insure intimate contact during reaction. Any of the mixing and agitating means employed in other alkylation processes may be employed for this purpose, such as circulating pumps, jet injectors, or internal agitating and circulating devices adapted to circulate the reaction mixture within a single reaction vessel. The agitation should be sufficient to produce a finely divided emulsion which will be stable until it is desired to separate the non-aqueous and catalyst phases at the conclusion of the reaction. Increased agitation generally improves the results secured, and the ultimate limit in this regard will be determined by economic considerations, in view of the power consumption required to improve agitation and the difficulties which may be encountered in separating a very finely divided and relatively stable emulsion.

The time required for completion of the alkylation reaction will depend to some extent upon the temperature employed, but will generally be of the order of 10-30 minutes. A contact time of 15-20 minutes is very satisfactory for operation at 100 to 120° F., but somewhat improved results may be obtained by the use of longer contact times. The expression "contact time," is to be understood as signifying the time required to displace the non-aqueous phase in the reaction zone by total feed, i. e., fresh feed mixture plus any externally recycled aromatic reactant or reaction product. Contact times of less than 10 minutes may be employed without adverse effect on the quality of the product, but too short a contact time will tend to decrease the conversion obtained.

Although contact time may serve as a guide for both batch and continuous methods of operation, space velocity constitutes a better means of control for continuous operation. For the present process, space velocity is considered to be the volumes of feed per volume of catalyst per hour. The space velocity is preferably maintained between 0.6 and 6.0, based upon the total feed mixture, or between 0.1 and 1.0, based on olefin feed.

With the exception of the differences pointed out above, our process may be effected in accordance with any of the known procedures which have been employed in the past for other alkylation reactions.

Our invention may be further illustrated by the following specific examples:

Example I

A catalyst was prepared by absorbing gaseous boron trifluoride in water at room temperature. The gas was bubbled through a layer of mercury at the bottom of a glass vessel filled with water. The initial reaction of the boron trifluoride and water produced a voluminous precipitate which gradually disappeared on continued introduction of the gas. When the solution became saturated, the introduction of the boron trifluoride was stopped, whereupon a slight slurry settled out, leaving a clear solution of specific gravity 1.77 (at the room temperature of about 72-75° F.). This solution corresponded in composition to the formula $BF_3 \cdot H_2O$.

A pressure vessel equipped with a mechanical agitator was charged with 354 parts by volume (200 parts by weight) of a catalyst prepared as described above, and approximately 550 parts by volume (480 parts by weight) of substantially dry benzene. This mixture was agitated at a temperature of about 115° F., and ethylene was added until the total reactant ratio was approximately 8 parts by weight of benzene per part by weight of ethylene. The pressure in the reaction vessel during the ethylene addition was sufficient to maintain liquid phase condition of the reaction mixture. After the addition of the ethylene, the reaction conditions were maintained for a sufficient time to ensure substantially complete reaction, and the mixture was then cooled and allowed to settle. The non-aqueous layer was separated and fractionally distilled to recover the reaction product. The total alkylate (material boiling above benzene) amounted to 155% by weight, based on the weight of the ethylene charged. Of this material, at least 89% by weight was ethylbenzene.

Example II

A pressure vessel equipped with a mechanical agitator was charged with 200 parts by volume of a catalyst of the approximate constitution $BF_3 \cdot H_2O$, and 1000 parts by volume of substantially dry benzene. This mixture was agitated at a temperature of about 108° F. and ethylene was slowly added over a period of 35 minutes while maintaining sufficient pressure to ensure liquid phase condition of the reaction mixture. The amount of ethylene thus added corresponded to a total reactant ratio of 2.85 mols of benzene per mol of ethylene. The mixture was then cooled and allowed to settle, and the non-aqueous layer was separated and fractionally distilled to recover the reaction product. The total alkylate (material boiling above benzene) amounted to approximately 178% by weight, based on the weight of the ethylene charged. Of this material, at least 83% by weight was found to be the desired mono-alkylated product.

Example III

A copper lined pressure reaction vessel was equipped with a mechanical agitator, a charge line at the bottom of the vessel, and an overflow line at the top of the vessel connected to another pressure vessel serving as a gravity separator. The separator was also equipped with an overflow line at the top of the vessel, connected to a product recevier, and with a catalyst recycle line at the bottom of the vessel, permitting gravity flow of the lower layer from the settler to the charge line at the bottom of the reaction vessel.

The reaction vessel was about half filled with 660 parts by volume of a catalyst of the approximate constitution BF$_3$.H$_2$O and the remainder of the vessel was then filled with substantially dry benzene. The mixture was agitated and maintained at about 120° F. while introducing through the charge line a substantially dry liquid mixture of benzene and ethylene in a ratio of 5 mols of benzene to one mol of ethylene. The charge rate corresponded to a contact time of 17 minutes, or a space velocity of approximately 3.5.

The introduction of the charge displaced the agitated reaction mixture, or emulsion, from the top of the reaction vessel to the settling vessel, where it separated into two layers. The non-aqueous layer was continuously withdrawn from the top of the settling vessel to the product receiver, and the lower layer in the settling vessel was continuously returned to the bottom of the reaction vessel by gravity flow.

Samples were periodically removed from the product receiver, and were fractionally distilled to recover the reaction products. Conversions to the alkylated products were calculated on the basis of the ethylene charged during the period of time corresponding to that required to collect the sample in the product receiver. A product sample taken at about the middle of this run had a content of total alkylate boiling above benzene, amounting to 163% by weight, based on the ethylene charged. Of this material, at least 82% by weight was found to be ethylbenzene.

During the run described above, the catalyst became increasingly deactivated through removal of BF$_3$ in the withdrawn non-aqueous phase, with resulting low conversions toward the end of the run. At the conclusion of the run, 50 parts by volume of the deactivated catalyst were withdrawn from the reaction vessel and BF$_3$ was added to the remaining catalyst in an amount approximately 30% of that in the original catalyst. The alkylation was then resumed, under the conditions of the original run, and five consecutive product samples were taken which had an average content of total alkylate of 165% by weight, based on the ethylene charged. Of the total alkylate, the average content of ethylbenzene was more than 84% by weight.

*Example IV*

The general procedure of Example I was followed, employing 485 parts by volume of liquid propylene in place of the ethylene used in Example I. The propylene was inadvertently introduced into the reaction vessel at an undesirably high rate, and the reaction temperature rose to a maximum of about 158° F. These reaction conditions resulted in a lower ratio of mono-alkylated product to total alkylate than was obtained in the preceding examples. In this case, the reaction product contained total alkylate, boiling above benzene, amounting to 184% by weight of the propylene charged; but only approximately 62% by weight of this alkylate was isopropylbenzene.

It is to be understood, of course, that the above examples are merely illustrative, and are not to be construed as limiting the scope of our invention. As has previously been pointed out, other alkylating agents and other aromatic compounds may be used in the place of the particular reactants employed in these examples. Similarly, other procedures may be employed for effecting the reaction and for maintaining the desired reaction conditions. In general, it may be said that the use of any equivalents, or modifications of procedure which would naturally occur to one skilled in the art, is included in the scope of this invention. Only such limitations should be imposed on the scope of our invention as are indicated in the appended claims.

We claim:

1. In the alkylation of benzene and its homologues with a normally gaseous olefin in the presence of compounds of boron fluoride with water, the improvement which comprises carrying out the reaction with a BF$_3$.$n$H$_2$O catalyst, where $n$ has a value ranging from 1 to 1.5, under conditions including temperatures within the range of 75–125° F. to produce essentially the corresponding mono-alkylated compound.

2. In the alkylation of benzene with ethylene in the presence of compounds of boron fluoride with water, the improvement which comprises carrying out the reaction with a BF$_3$.$n$H$_2$O catalyst, where $n$ has a value ranging from 1 to 1.5, under conditions including temperatures within the range of 75–125° F. to produce a total alkylated product containing at least about 82% by weight of ethyl benzene.

FRANK HENRY BRUNER.
LOUIS ALFRED CLARKE.
RICHARD LEIGH SAWYER.